United States Patent [19]

Rukovena, Jr.

[11] Patent Number: 4,708,856

[45] Date of Patent: Nov. 24, 1987

[54] LIQUID-GAS ABSORPTION PROCESS

[75] Inventor: Frank Rukovena, Jr., Tallmadge, Ohio

[73] Assignee: Norton Company, Worcester, Mass.

[21] Appl. No.: 899,706

[22] Filed: Aug. 22, 1986

Related U.S. Application Data

[63] Continuation-in-part of Ser. No. 835,842, Mar. 3, 1986, abandoned.

[51] Int. Cl.$^4$ .............................................. C01B 17/00
[52] U.S. Cl. .................................. 423/242; 423/512 A
[58] Field of Search .......... 423/242 A, 242 R, 244 A, 423/244 R, 512 A

[56] References Cited

U.S. PATENT DOCUMENTS

| | | | |
|---|---|---|---|
| 3,505,788 | 4/1970 | Teller et al. | 55/233 |
| 3,607,037 | 9/1971 | Terrana et al. | 23/178 |
| 3,607,038 | 9/1971 | Taylor | 23/178 |
| 3,607,039 | 9/1971 | Miller et al. | 23/178 |
| 3,615,198 | 10/1971 | Terrana et al. | 23/178 |
| 3,615,199 | 10/1971 | Terrana et al. | 23/178 |
| 3,627,464 | 12/1971 | Terrana et al. | 23/178 |
| 3,653,812 | 4/1972 | Schneider et al. | 23/2 |
| 3,687,623 | 8/1972 | Terrana et al. | 423/242 |
| 3,687,624 | 8/1972 | Terrana et al. | 423/242 |
| 3,687,625 | 8/1972 | Terrana et al. | 423/242 |
| 3,733,777 | 5/1973 | Huntington | 423/242 |
| 3,790,660 | 2/1974 | Earl et al. | 423/242 |
| 3,971,844 | 7/1976 | Schneider | 423/182 |
| 4,079,119 | 3/1978 | Nicholson et al. | 423/242 |
| 4,467,073 | 8/1984 | Creasy | 525/127 |
| 4,511,519 | 4/1985 | Hsia | 261/94 |

FOREIGN PATENT DOCUMENTS 1201789  11/1967  United Kingdom .

*Primary Examiner*—Gregory A. Heller
*Attorney, Agent, or Firm*—Rufus M. Franklin

[57] ABSTRACT

A process for absorbing $SO_2$ from a gas in a packed column employs a low aqueous sulfite feed rate of 0.05 to 1 gallon per minute per square foot of tower cross section, or preferably 0.1 to 0.3 gallons per minute per square foot. Lower capital costs and lower operating costs result because of less tower equipment, lower pressure drop, reduced oxidation to sulfate, and elimination of pump around as compared to the conventional processes. Also disclosed is an improved liquid distributor.

7 Claims, 5 Drawing Figures

४,७०८,८५६

LIQUID-GAS ABSORPTION PROCESS

This application is a continuation-in-part of co-pending application Ser. No. 06/835,842, filed Mar. 3, 1986 now abandoned.

FIELD OF THE INVENTION

This invention relates to an improvement in liquid-gas contact apparatus and process where sulfur dioxide is absorbed into or reacted with the liquid. A particular application is in the absorber of the Wellman-Lord process for the removal of sulfur dioxide from exhaust gases by aqueous sulfite solution, particularly from combustion power plant flue gases, although it is also applicable to exhaust streams from smelters, sulfuric acid plants, or any other sulfur dioxide containing gas streams.

BACKGROUND OF THE INVENTION

As an example of a process requiring an aqueous liquid-gas contact apparatus, the Wellman-Lord process of sulfur dioxide removal from stack gases employs an aqueous alkali sulfite solution (usually sodium sulfite) which chemically combines with the sulfur dioxide gas in an absorption tower by forming sodium bisulfite. The process includes a separate regeneration facility to convert the bisulfite back to sulfite and recover sulfur dioxide gas which is compressed and bottled or converted sulfuric acid or to elemental sulfur. In the case of flue gases from coal fired plants, a separate unit for removal of fly ash and chlorides is included.

Because of large capital costs and high energy requirements to overcome the pressure drop in the absorber, in the regenerable Wellman-Lord process, non-regenerable flue gas desulfurization processes have been the more popular choice in the past, in spite of the major problem of disposal of solid waste produced by such processes.

The present invention is an improvement in absorption apparatus and its operation and in particular the process of the invention relates to the absorber of the Wellman-Lord process whereby capital costs and parasitic power requirements are reduced so as to make the regenerable process more economic and thus avoid the solid waste problem of the non-regenerable processes.

DESCRIPTION OF THE INVENTION

Figure 1:
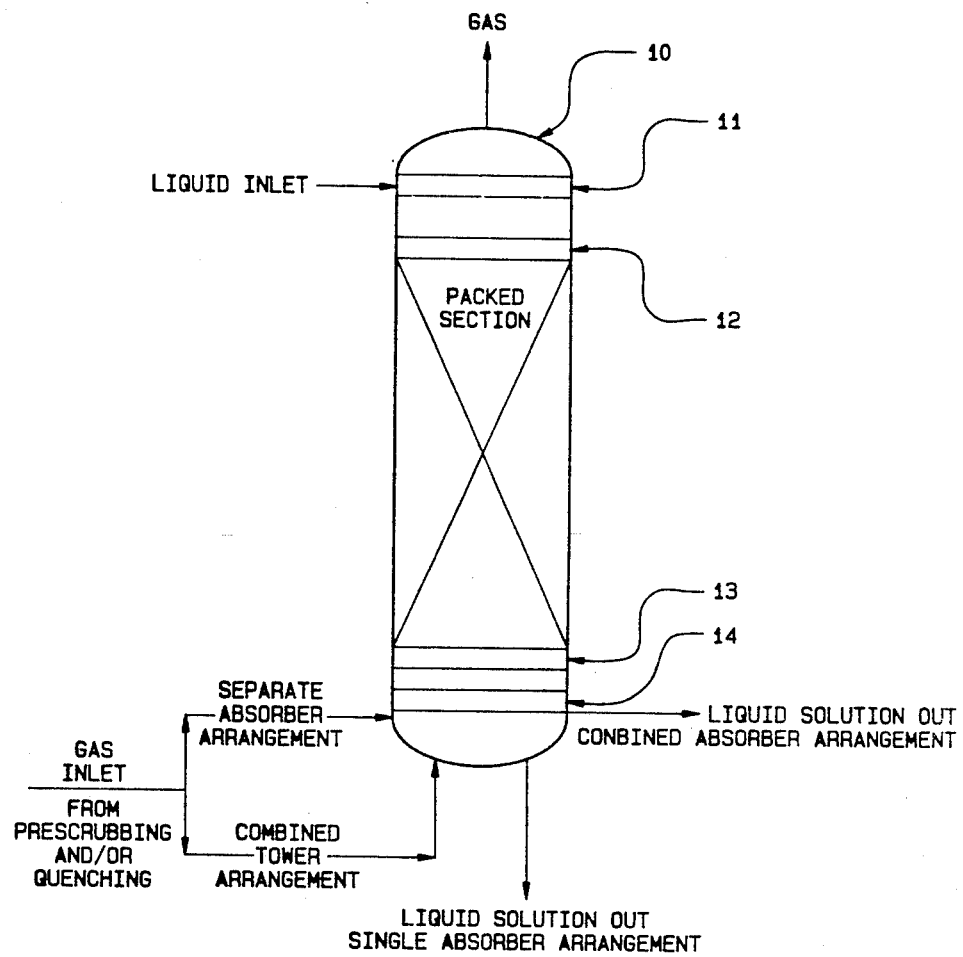
FIG. 1 is a schematic of an adsorption column 10, indicating the position of a liquid distributor 11, an optional packing retainer 12, packing support 13, and conventional gas distributor and liquid collection, if necessary, 14, with the liquid and gas inlets and outlets indicated.

By employing liquid distribution at extremely low liquid flow rates and high efficiency packing, the present invention can achieve the absorption step in a single relatively short packed column of low pressure drop, and without the requirement of recycle of the absorbate solution prior to regeneration.

The flow rate for liquid fed to the top of the tower is from 0.05 to 1.0 gallons per minute per square foot, or more preferably from 0.2 to 0.3 gallons per minute per square foot. Only fresh absorbant solution is employed, without recycle. With the use of such low liquid flow rates, the tower packing is chosen so that its operation is compatable with the low liquid rate. One suitable type is that in which the operation is primarily one of combination and separation of droplets, rather than by a spreading of the liquid on large wetted areas of the packing. A suitable packing of this type is a high void volume packing shown in U.S. Pat. No. 4,511,519 to Hsia, the disclosure of which is incorporated herein by reference. The packing has a large number of drip points, a relatively low surface area, but relatively long total length of non-aligned interacting edges.

Because of the low liquid rate of the present invention, with one half to one tenth of the liquid retention time of the conventional practice using trayed towers or a plurality of packed towers with trap trays, in the Wellman-Lord process, the problem of oxidation of sulfite to sulfate is reduced by an amount of 50% to as much as 90%. This is important in that the sulfate reduces the absorption efficiency of the liquid and thus must be removed in the regeneration process, adding capital and operational expenses to the process. In addition, the sulfate salts are a solid waste which must be disposed of in an environmentally safe manner.

In order to distribute liquid onto the packing so as to take advantage of the low flow rate a drip type distributor which provides at least 3 and preferably at least 6 to 9 feed points uniformly spaced per square foot may be employed. A suitable liquid distributor originally intended for non-polar liquids which can be adapted for this purpose is shown in U.S. Pat. No. 4,264,538 to Moore, the disclosure of which is incorporated herein by reference. While this type of distributor as disclosed in the patent was designed for organic liquids, it can be adapted for use in the present invention by use of hydrophylic coatings, as later described below. Other types of liquid distributors may be employed, and, in the larger diameter towers a spray type distributor, suitably designed for low liquid rates may be preferable, because it is less costly. Any other type of distributor suitable to deliver the required low liquid flow may be employed. If the distributor is less efficient, the length of the packed bed must be increased. Thus less efficient distribution methods may be employed, with a penalty paid in the higher costs and pressure drop inherent in the deeper bed.

When a metal (stainless steel) trough type or drip type distributor is used, the surfaces of the distributor, outside of the feed troughs which convey the liquid, should be coated with a hydrophylic microporous coating which causes a film of liquid to be formed on such surfaces as the liquid flows on them by gravity. The drip fingers, which are coated, should also all extend to be close to or contacting a surface of the packing (or packing retainer, if used). The distance should not be substantially greater than the diameter of the liquid droplets being fed, so as to avoid entrainment of the liquid by the countercurrent flowing gas. Such an arrangement produces maximum efficiency and can avoid the need for a demister at the exit of the absorber.

Figure 2:
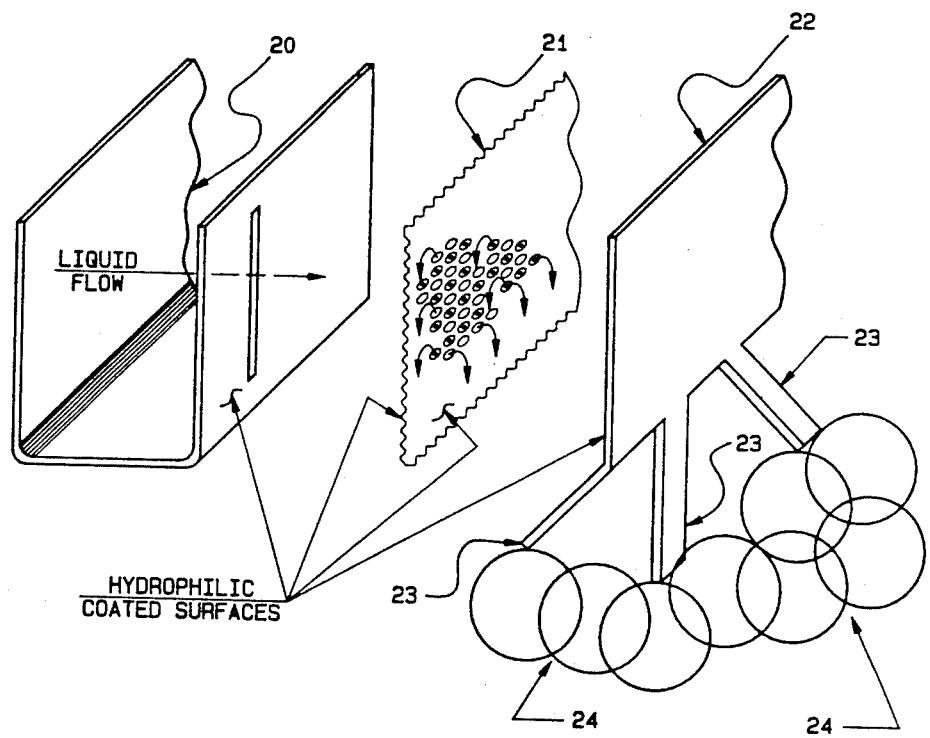
FIG. 2 is an exploded broken view of a portion of a preferred liquid distributor having a supply trough 20, a spacing element 21, and a flow guide 22. Attached to flow guide 22 are drip fingers or rods 23 having ends adjacent packing (shown schematically) at 24.
Figure 3:
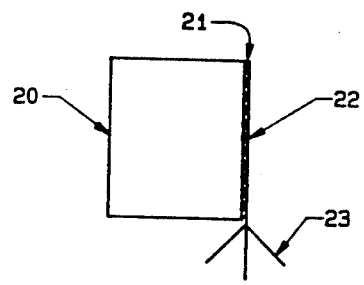
FIG. 3 is a schematic side view, assembled, of the parts of a preferred distributor shown in FIG. 2.
Figure 4:
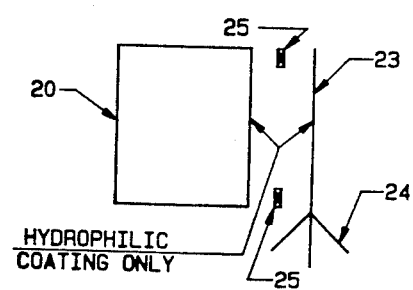
FIG. 4 is an exploded schematic side view of a similar arrangement to FIG. 2, but with the element 21 replaced by spacers 25.
Figure 5:
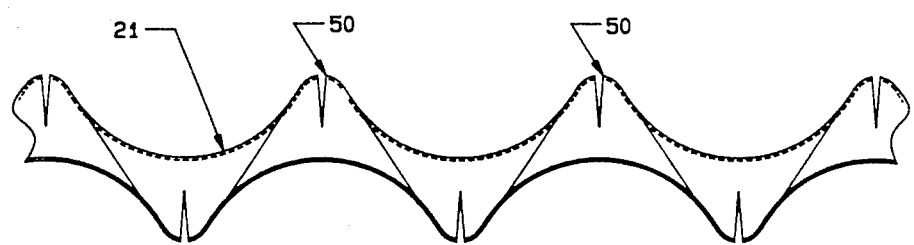
FIG. 5 is an enlarged cross-sectional view of a portion of element 21.

In the following examples a packing element as shown in FIGS. 7 through 10 of U.S. Pat. No. 4,511,519 was employed, having a diameter of 3½ inches and an axial height of 1¼ inches. The packing depth was 7.5 feet. A liquid distributor such as described in U.S. Pat. No. 3,937,769 was employed, having 9 drip fingers per square foot. The operative surfaces of the distributor were coated with a resin latex drag resistant hydrophylic coating as described in U.S. Pat. No. 4,467,070, sold by Hydromer, Inc., Whitehouse, N.J. The distributor also included a dimpled, perforated plate as shown at 21 in FIGS. 2, 3, and 5. The dimples were alternately facing in opposite directions. The dimples 50 of FIG. 5 in this case were 3/16 inches apart, in an 8 mil steel sheet, to help distribute the liquid. The tower was 30 inches in diameter. The liquid composition was composed as follows:

|  | Weight % |
|---|---|
| $Na_2SO_3$ | 17.4 |
| $Na_2S_2O_5$ | 2.9 |
| $Na_2SO_4$ | 6.0 |
| $H_2O$ | 73.7 |

The test results are shown in Table I.

Table II shows the pressure drop and the calculated mass transfer coefficient for each run. The highest mass transfer coefficients were obtained for the runs in which the gas rate was such that the tower was operating in the loading zone. That is, the gas rate was sufficiently high to cause increased liquid hold-up in the tower resulting in increased pressure drop and gas liquid contacting because of the added space taken up by the liquid.

TABLE I

| Run No. | Liquid Rate GPM/Ft² | Gas Rate Lbs/hr/ft² | Gas SO₂ Parts/Million | |
|---|---|---|---|---|
|  |  |  | Inlet | Outlet |
| 1 | 0.145 | 1813.3 | 717.2 | 160 |
| 2 | 0.142 | 3374.6 | 711.7 | 220 |
| 3 | 0.157 | 3526.0 | 944.5 | 510 |
| 4 | 0.312 | 3631.7 | 1402.1 | 400 |
| 5 | 0.157 | 1964.1 | 1065.7 | 600 |
| 6 | 0.324 | 3481.4 | 676.0 | 80 |

TABLE II

| Run No. | Pressure Drop Inches of H₂O/ft | Mass Transfer Coefficient $K_Ga$ LB Moles/hr-ft³-ATM |
|---|---|---|
| 1 | 0.105 | 13.4 |
| 2 | 0.388 | 22.1 |
| 3 | 0.429 | 15.5 |
| 4 | 0.429 | 28.2 |
| 5 | 0.113 | 6.8 |
| 6 | 0.461 | 39.4 |

The use of a single packed bed greatly reduces the capital cost of the absorber compared to present design practice used in Wellman-Lord plants. The single packed bed also greatly reduces the operating cost, primarily in the area of the blower horsepower needed to feed the gas through the absorber but also by eliminating the presently required liquid recycle pumps. The packed bed, to achieve these energy savings, preferably uses a high efficiency packing which can achieve in a minimum length of bed the necessary mass transfer contacting efficiency, and has sufficiently low pressure drop to make the energy savings possible.

Partial capital cost and energy saving benefits can be achieved by using less than optimum arrangements of this process invention. That is, rather than replacing all of the pump-a-round sections in prior absorption processes with a single packed bed, it is possible to combine some of the pump-a-round sections into two or three sections. These sections can still employ liquid recycle to achieve the high liquid rate operation but still have some pressure drop reduction. The energy savings here comes from the elimination of some of the trap trays. The elimination of the trap trays also saves considerable capital; the trap trays are very expensive because of their stainless steel construction.

One further partial simplified configuration is possible. This configuration uses two beds. The top section would be a packed section using the once through regenerated absorption solution at low liquid rate. Thus, making an off gas with the lowest possible SO₂ content because of low SO₂ vapor pressure in the regenerated solution. The lower bed would be recirculated for the benefit of the higher liquid rates for easier liquid distribution, and would tend to eliminate potential salt precipitation problems caused by dry areas.

Thus the single bed, with no pump around, employing low liquid rate may be used to absorb SO₂ from a gas stream directly from its source, or, as the final stage, from any intermediate pollution control apparatus including fly ash removal and chloride removal where required for coal burning power plants.

In normal operation typically a 10 to 20% stoichiometric excess of sorbent sulfite solution will be fed to the tower, based on the concentration of the sulfite and the liquid and gas feed rates. In some cases, however, it may be more desireable to fully react the sorbent liquid for efficient regeneration, than to remove all of the SO₂ from the gas. In such cases the liquid feed would be somewhat deficient, on a stoichiometric basis.

What is claimed is:

1. A method of removing SO₂ from a gas stream comprising passing said gas stream to the bottom of a packed tower and feeding aqueous sulfite solution to the top of the tower at a rate of 0.05 to 1.0 gallons/minute-square foot, withdrawing gas depleted in SO₂ from the top of the tower and withdrawing bisulfite solution from the bottom of the tower wherein the aqueous sulfite solution is distributed by either a spray type distributor or a trough type distributor.

2. A method as in claim 1 in which the total sulfite content of the entering liquid per unit of time is at least equal to the sulfur dioxide content of the entering gas, per unit of time, on a molar basis.

3. A method as in claim 2 in which the aqueous sulfite is an alkali sulfite.

4. A method as in claim 1 in which the aqueous sulfite solution is distributed by a spray type distributor.

5. A method as in claim 1 in which the sulfite solution is distributed by a trough type distributor.

6. A method as in claim 5 in which the distributor has a hydrophylic surface from which the liquid flows to the packing.

7. A method as in claim 1 in which the liquid rate is 0.2 to 0.3 gallons per minute per square foot.

* * * * *